July 15, 1969 A. J. PANTOS 3,456,252

INTERLOCK CIRCUIT

Filed Oct. 11, 1965 2 Sheets-Sheet 1

INVENTOR.
ATHANASIUS J. PANTOS
BY Fetherstonhaugh & Co.
ATTORNEYS

INVENTOR.
ATHANASIUS J. PANTOS
BY Fetherstonhaugh & Co
ATTORNEYS

United States Patent Office 3,456,252
Patented July 15, 1969

3,456,252
INTERLOCK CIRCUIT

Athanasius J. Pantos, 132 Kingsview Blvd., Weston, Ontario, Canada

Filed Oct. 11, 1965, Ser. No. 494,818
Claims priority, application Canada, Sept. 16, 1965, 940,692
Int. Cl. G08b *25/00*
U.S. Cl. 340—295 4 Claims

ABSTRACT OF THE DISCLOSURE

A plurality of associated binary signalling transmitter-receiver pairs is connected so that a receiver can receive information from any of the transmitters. A circuit is connected, responsive to signalling by a transmitter, for preventing reception of the signal by the associated receiver.

This invention relates to improvements in binary communications systems wherein the output of a means of transmitting binary information is connected to two or more means for receiving binary information, and an associated receiving means is connected to two or more transmitters of binary information.

It is an object of the invention to provide circuitry whereby, with an associated receiver and transmitter combination, binary information originating with the associated transmitter is not received by the associated receiver, but such binary transmission is available to other receivers.

The invention is designed for use with systems wherein the transmitters have a normal state and a non-normal state; the two states together allowing the transmitter to convey the binary information and wherein the receivers will assume a first or "normal" state when no transmitter is transmitting and a second or "non-normal" state in accord with the information to be conveyed when one transmitter is transmitting. (The situation where two transmitters are transmitting is, with the system, contemplated an abnormal situation and one which cannot provide for reception of either signal by a receiver connected in accord with the preferred embodiment of the invention.)

It is an object of this invention to provide circuitry for use with an associated transmitter and receiver, to provide circuitry which on change of the associated transmitter to the non-normal state, prevents the associated receiver from receiving the associated non-normal (i.e., the second) state, hence the information transmitted is not reflected back to the associated receiver. On the other hand, the non-normal state signals transmitted by the associated transmitter are received by other receivers connected to the same system.

It is an object of this invention to provide circuitry interlocking the associated transmitter and receiver as described in the previous paragraph wherein use is made of a gaseous discharge tube having a striking potential of one level and a cutoff potential of a lower level and wherein intermediate said potential values, the discharge will continue once initiated, but will not start. The interlocking circuitry is designed and constructed to maintain, across the discharge tube in the normal state of the transmitter, a voltage below the cutoff potential, but to place across the gaseous tube, a striking potential when the transmitter is moved to its non-normal state and thereafter during the existence of the transmitter non-normal state to maintain the potential sufficient to continue conduction across the tube. When the transmitter goes back to the normal state, the circuitry returns the potential across the tube to a value below the cutoff value and the tube is switched off. Means are provided, actuable by the occurrence of a discharge in the tube, to apply a signal to the receiver line which would then normally be passing the second state signals, such signal being effective to obliterate, at the receiver, the second state signals. Thus, the transmission by the associated transmitter does not affect its associated receiver since the associated transmitter signals are there obliterated. Conversely, however, the interlock does not affect reception by any receiver not associated with the transmitter, nor does it prevent the associated receiver from receiving from other transmitters.

In a preferred form of the invention, the circuitry provides that in the event that two transmitters including the corresponding one are attempting to transmit contemporaneously, then second state signals are received by the receiver. Although the intelligence may not be transmitted or received with two transmitters operating simultaneously, reception of second state signals by the corresponding receiver with the corresponding transmitter in operation acts as an indicator that two transmitters are transmitting, indicating at the receiver that the operation of the associated transmitter should be halted.

In drawings which illustrate a preferred embodiment of the invention in combination with a hub-coupling unit, FIGURE 1 shows a method of coupling a plurality of hub-coupling units;

Figure 1:
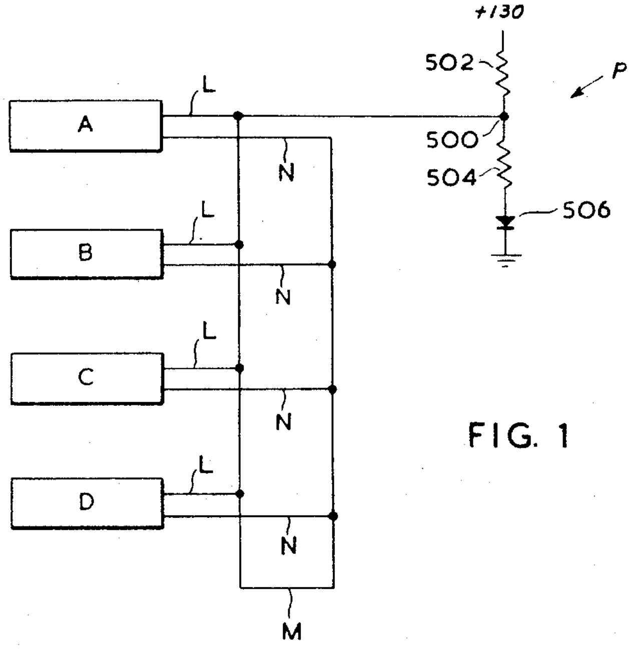

In FIGURE 1 a plurality of transmitter-receiver combinations lettered A–B–C–D are shown, lines L from the transmitter of each combination are coupled together and connected to the intermediate terminal 500 of a potentiometer P. The reception lines N of the combinations are connected together and to the line L by a shorting connection M.

If desired, the shorting line M may be replaced by a regenerative repeater, and the latter will be used where the characteristic of the transmitted signal in the system require it.

In the system shown, the potentiometer P comprising a 130 volt source is connected through resistance 502, intermediate point 500 and resistance 504 to ground. The transmitters herein are so designed that with no transmitter operating, the potential at point 500, will be at a predetermined level—here 60 volts—representing one of the binary states (say), "mark" and also being the "rest" or "normal" state. On the other hand the operation of one of the transmitters will in accord with usual circuits of this type, and the circuitry to be described, vary the potential at point 500 to −30 volts, indicative of "space" or the "non-normal" of the binary states.

Because of the connections of the receivers to point 500, the potential states of the point 500 will appear at all receivers as binary signals. Simultaneous transmission by two transmitters will prevent the intelligence of either being received, but this will not normally occur since the reception of signals, from a first transmission, at the receivers of the associated receivers and transmitters, will indicate to associated transmitting stations that their transmission must be delayed until prior transmissions are finished.

Figure 2:
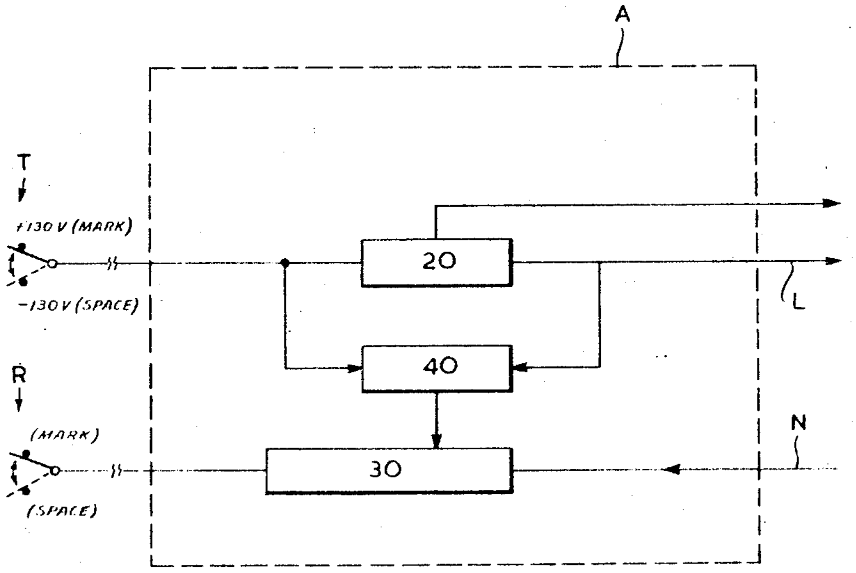
FIGURE 2 shows a block diagram of a hub-coupling unit.

In FIGURE 2 is shown a block diagram of the components of an associated transmitter and receiver wherein the device, for applying one of two potential states in the binary signalling, is connected through a transmitter circuit 20, and from thence to terminal 500 of potentiometer P.

Point 500 is connected through line N to the associated receiver 30 (shown in FIGURE 2) and the associated receiver 30 is designed to produce at the device R, an indication of "mark" or "space" being its first and second states, respectively, conditional on the state of the line N to receiver 30. The device R may produce the "mark" or "space" indications in any one of a number of desired ways. The receiver 30 with the device R, performs a repetitive function, and this may be performed in any one of a variety of well-known means.

Connected in parallel with the transmitter circuit 20 is interlock circuit 40, the subject of this invention, such circuit being connected also to the associated receiver 30.

Figure 3:
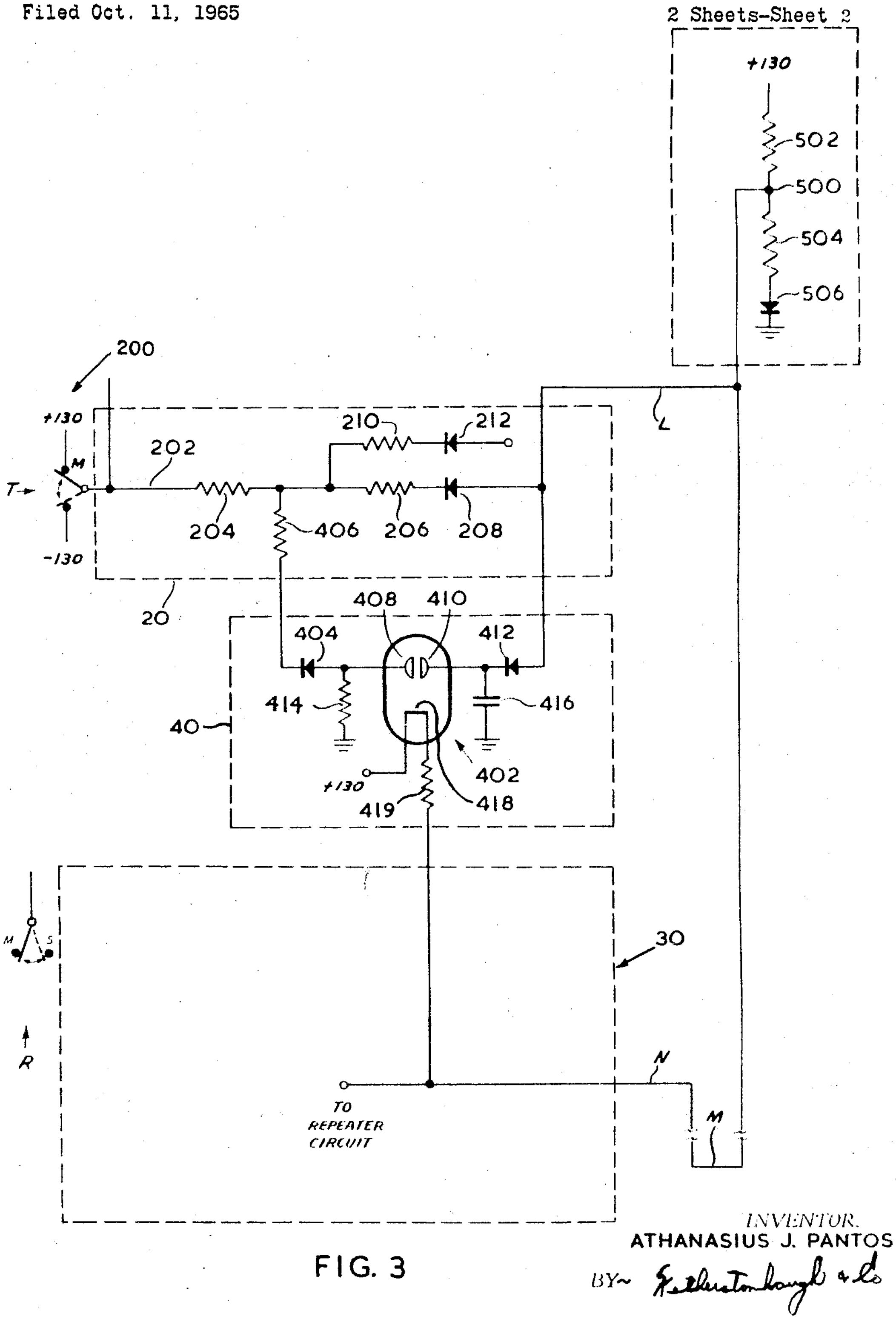
FIGURE 3 shows a detailed drawing of a transmitter in a hub-coupling unit, showing a preferred form of the inventive means connected to the associated transmitter and receiver.

In FIGURE 3, is shown the preferred embodiment of the interlock circuit in detail in combination with an associated transmitter receiver combination. In the drawing, is shown, the transmitter circuit 20, including the device or switch T for aplying +130 volts (the normal state) or −130 volts (the non-normal state) to the line 202. The line 202 is connected through resistances 204, 206 and rectifier 208 in series to potentiometer terminal 500. The rectifier 208 is oriented to conduct when the potential is higher at point 500 than at the transmitter.

Although the schematic indication of the switch T might tend to indicate that it was manually operated, it will be realized, that the indication is schematic only and that the "mark" and "space" (i.e., normal and non-normal) potentials (±130 volts in the preferred embodiment) may be placed on the line 202 in accord with whatever encoding or transmission method or apparatus is used.

Rectifier 208 on the end remote from resistance 206 is connected to the intermediate terminal 500 of a potentiometer. The potentiometer intermediate terminal 500 is connected through a resistance 502 to a +130 v. D.C. source and through a resistance 504 and rectifier 506, in series to ground. The rectifier 506 is oriented, in the specific embodiment, to conduct when the potential at point 500 is higher than ground. The rectifier 506 is not essential but is used to maintain point 500 at a lower potential level during the existence of −130 volts on line 202, than would otherwise be the case. The resistances are adjusted so that the voltage is preferably 60 volts at intermediate terminal 500 at the "mark" potential of 130 volts on line 202 of all transmitters—i.e., the potential when point 500 is unaffected by a non-normal potential (i.e., −130 volts) from any transmitter.

I will be seen that this situation exists when the voltage at each switch or signalling device 200 is at +130 volts so that in each transmitter, the effect of the +130 volts is blocked by the rectifier 208.

On the other hand with the switch or signalling device T of one transmitter at −130 volts the potential of point 500 will go to −30 volts.

These then are the voltages (+60 volts and −30 volts) which convey the binary information to other receivers and embody the first and second binary states, respectively, in connection therewith and corresponding to the normal and non-normal state of the transmitters.

As indicated in FIGURE 2 such voltages appear not only on all transmitter lines L but also through short M at all receiver lines N. Thus, with two transmitters operating simultaneously (an unwanted situation) the intermediate terminal 500 subjected to two simultaneous "space" signals, will reach a potential slightly more positive than −60 volts, a fault situation. Moreover the intereffect of the two binary transmissions will prevent the intelligence of either from being conveyed.

In parallel with the resister 206 and rectifier 208 just described, a resister 210 and rectifier 212 are provided connected in series to line 202 between resistances 204 and 206, with the rectifier 212 oriented to conduct with a potential gradient across it falling in the direction of line 202. The terminal of the rectifier 212 remote from the line 202 may be connected to a source higher than −130 volts through actuation means for a light or bell or other sensible indication that the transmitter is operating.

There will now be discussed the interlock circuit 40 which is connected at one end to the transmitter 20 to sense when the transmitter is on the non-normal setting, and hence transmitting and is connected to the associated receiver 40, but to no other receiver, to apply on receipt of an indication that the non-normal state is being transmitted by the associated transmitter, a signal which will obliterate the receipt of the resultant second or non-normal state, at the associated receiver.

In FIGURE 3, then is shown the interlock circuit 40 which in relation to the transmitter is in parallel with the resister 206 and the rectifier 208. There is provided a gas discharge tube 402 having a pair of discharge terminals. One of these terminals, 408, is connected through a rectifier 404 and resistance 406 in series to the transmitter circuit on the transmitter side of rectifier 208; and the other of these, 410 is connected through a receifier 412 to the potentiometer side of rectifier 208. The rectifiers 404 and 412 are oriented to conduct in the same direction as the rectifier 208 between the potentiometer 500 and transmitter T. The discharge terminal 408 is preferably grounded through a grounding resister 414 and the discharge terminal 410 on the potentiometer side of the tube 402 is connected through a condenser 416 to ground or other voltage datum. A light sensitive element 418 forms part of the gas discharge tube 402, the element having a pair of terminals and being designed to conduct when the discharge tube 402 is on and to be non-conducting when the tube is off. To said terminals is connected respectively a +130 volt source and a connection through a resistance 419 to the line N going to associated receiver 30. Since the function of the resister is to apply the 130 volts to the receiver line N when the tube is in operation, it will be realized that alternative constructions may be used where a gas discharge tube is used, but wherein a separate light sensitive element is used in place of element 418 and rendered conducting by discharge in the tube to connect the 130 volts to the receiver line.

The tube 402 is designed to have a higher striking potential between its discharge terminals and a lower cut-off voltage and to sustain the discharge at intermediate voltages. With the tube suggested, which is made under the trademark "Raysistor," the tube will "fire" or strike at approximately 120 volts and will extinguish at about 75 volts. In operation with all the transmitters in their "normal" position at +130 volts, the +130 volts from the associated transmitter T is blocked by the rectifier 208 and the potentiometer will have a voltage of +60 volts. The voltage across the discharge terminals will be 60 volts being the +60 and the 0 contributed by the grounding resister 414 when conduction is not taking place through rectifier 404. Thus, the tube will be unlit. (The voltage will be about 60 volts and the tube will remain unlit even if resister 414 is omitted.)

This situation will not alter if a transmitter other than the associated transmitter is transmitting, since the voltage across the discharge tube will remain at +60 volts maintained by condenser 416 on the potentiometer discharge terminal 410 to the 0 of terminal 408. In the normal situation, therefore, with all the transmitters inactive, +60 volts is applied to the condenser 416 which is charged to this value. When the associated transmitter T is moved to the non-normal position, −130 volts is applied to the transmitter side discharge terminal and 190 volts (−130 to +60) appears across the discharge terminals exceeding the striking potential and causing the tube to fire. This causes the light sensitive element 418 to conduct and the +130 volts is applied to the receiver circuit 30 obliterating the space signal appearing on line N as a result of movement of the associate transmitter 20 to "space." As soon as the condenser 416 has discharged, the potential at the discharge terminals is −130 volts on the transmitter side and −30 volts on the potentiometer side, the latter being the value to which the potentiometer terminal 500 has reached as a result of the application of −130 volts thereto, and this voltage of 100 volts is sufficient to sustain the discharge and to continue to obilterate the space signal at the associated receiver line N. Thus, it will be seen that on the initiation and for the duration of the space signal at the associated transmitter, the corresponding signal will be obliterated at the associated receiver, although not of course at any other receiver. When the transmitter is moved back to mark or +130 volts the corresponding discharge terminal 408 moves to 0 while the hub potentiometer is moving from −30 to +60, hence the tube will be extinguished and condenser 416 will recharge to +60 volts. Thus, it will be seen that for normal operation of a transmitter when no other is operating, each space will be obliterated at the associated receiver and the "reflection" of signals will be avoided.

On the other hand, if another transmitter and the associated transmitter are attempting to transmit simultaneously then the voltage at the potentiometer will be −60 volts. Thus, the potential difference when the associated transmitter line 202 goes to −130 volts is only 70 volts, insufficient to initiate or sustain a discharge in tube 402. (It does not matter to the function of the circuitry now being discussed that the tube will in this situation fire only for the period of discharge of condenser 416 and then cease to conduct.) Thus, in the event of contemporaneous operation of the associated transmitter and another transmitter, the tube will not conduct for the period of the "spaces" transmitted by the associated transmitter and hence space indications are not obliterated at the associated receiver 30, and from this the operator of the associated transmitter 20 will know that another transmitter is in operation, and that proper information is being transmitted by neither transmitter.

It should also be noted that after two transmitters (including the associated transmitter have simultaneously attempted to send a "space") when the transmitter other than the associated one moves from "space" to "mark" −130 to +130 volts during a "space" on the line 202, then the voltage across the tube will be 100 volts (−130−(−30)), insufficient to light the tube 402, hence the interlock circuit will not again operate to obliterate "space" signals at the receiver until both transmitters have been removed from the line.

What I claim as my invention is:

1. With an associated transmitter and a receiver circuit, said transmitter circuit being connected to a potentiometer terminal through a first rectifier, said potentiometer and terminal being connected so that said terminal will have a predetermined potential when unaffected by a transmitter, said transmitter circuit being designed to assume alternatively, a state having a potential higher and a state having a potential lower than the potential of said potentiometer terminal when unaffected by said states, said first rectifier being designed to prevent one of said states from affecting such potentiometer and allowing the other of said states to convert said unaffected terminal potential to a value intermediate the unaffected value and the value of such other state, a series circuit comprising a rectifier, a gas fired tube, and a rectifier in parallel with said first rectifier, said series circuit rectifiers being oriented to conduct in the same direction as said first rectifier, said tube, on the potentiometer side being connected through a condenser to a datum; said gas fired tube having a higher striking potential, a lower cutoff potential, and a sustaining voltage between said striking and said cutoff potential; said circuitry being connected so that the difference between said other state potential and said unaffected terminal potential is greater than said striking voltage; but so that the difference between said other potential and the terminal potential when affected by said other state is lower than said striking voltage but higher than said sustaining potential, a receiver circuit associated with said transmitter circuit and connected to said potentiometer in a manner to assume a first and a second state corresponding to said transmitter assuming said one and said other state; and a means actuable by the existence of the conducting state in said tube, for maintaining said receiver circuit in said first state, whereby when its associated transmitter is operating, said receiver stays in said first state.

2. Circuitry having a plurality of associated receiver and transmitter circuits each being of the type claimed in claim 1, wherein said potentiometer is connected to said transmitters to produce, with two transmitters operating, a third potential between said unaffected terminal potential and the potential when affected by said other state potential, the difference between said third and said other state potential being less than the sustaining value of said tube.

3. With an associated transmitter and a receiver circuit, a transmitter connectable to a potentiometer terminal through a first rectifier; a gas fired tube connected in parallel with said first rectifier; rectifiers in series with said tube on each side thereof in said parallel connection; said rectifiers being oriented to carry current in the same direction through said tube and being oriented to carry current in the same direction as said first rectifier; a condenser connected between said tube and the rectifier on the potentiometer side thereof, and said condenser being connected on its other side to a potential datum; said potentiometer terminal being connected to assume a predetermined potential level when said potentiometer is unaffected by its connection to the transmitter; said transmitter being arranged and designed to apply to the transmitter end of said connection, a potential higher or lower than the unaffected potential of said potentiometer terminal, whereby one of said separating rectifiers blocks one of said potentials from said tube and the other is applied across said tube on the initiation of said other potential; said separating rectifiers being so oriented in relation to the potential at said potentiometer terminal, that said separating rectifiers conduct in the direction wherein the greater difference of transmitter potential and unaffected terminal potential exists; said tube being designed and constructed to fire at the potential difference between said other potential and said unaffected terminal potential, to maintain conduction at the potential difference between said other potential and said terminal potential when affected by said terminal potential and being adapted to cut-off conduction at lower values; means operated by the existence of a discharge in said tube, preventing at the companion receiver, reception of signals corresponding to said one potential.

4. For a communications system, including a transmitter for transmitting information in binary form to a plurality of receivers; and a receiver associated with said transmitter for receiving binary information from a plurality of transmitters including said associated transmitter, wherein said receiver assumes a first and a second state responsive to a transmitter assuming, respectively, one and another binary state; a control circuit, including: a gaseous discharge tube having a higher voltage at which conduction therein will be initiated and a lower voltage at which conduction in said tube will be cut off, and wherein conduction once started will be maintained between said higher and lower voltages; means responsive to the change of said transmitter from said one to said other binary state, provide a striking potential across said tube; means responsive to the existence of said transmitter in said other binary state for maintaining a potential across said tube higher than said cut-off potential;

means responsive to conduction in said tube for maintaining said associated receiver in said first state.

References Cited

UNITED STATES PATENTS

| | | | |
|---|---|---|---|
| 2,694,802 | 11/1954 | Terry et al. | 340—295 X |
| 3,085,239 | 4/1963 | Hoover | 333—13 X |

JOHN W. CALDWELL, Primary Examiner

CHARLIE M. MARMELSTEIN, Assistant Examiner

U.S. Cl. X.R.

325—22; 333—13; 343—180